United States Patent [19]

Byers

[11] Patent Number: 5,926,472
[45] Date of Patent: Jul. 20, 1999

[54] METHOD AND APPARATUS FOR CROSSCONNECTING TRANSMISSION MEMBERS IN THE OUTSIDE DISTRIBUTION PLANT OF A TELECOMMUNICATIONS NETWORK TO PROVIDE A COMBINED NARROWBAND AND BROADBAND SIGNAL

[75] Inventor: Charles Calvin Byers, Aurora, Ill.

[73] Assignee: Lucent Technologies Inc., Murray Hill, N.J.

[21] Appl. No.: 08/669,883

[22] Filed: Jun. 21, 1996

[51] Int. Cl.⁶ ............................ H04L 12/50; H04Q 11/00
[52] U.S. Cl. .............................................................. 370/360
[58] Field of Search ..................................... 370/353, 355, 370/357, 338, 360, 380, 384, 351, 352, 354, 356; 348/6, 7, 12, 13, 14; 359/123, 124

[56] References Cited

U.S. PATENT DOCUMENTS

| | | | |
|---|---|---|---|
| 4,833,708 | 5/1989 | Goodrich | 379/327 |
| 4,855,999 | 8/1989 | Chao | 370/538 |
| 5,105,420 | 4/1992 | Ardon et al. | 370/216 |
| 5,343,240 | 8/1994 | Yu | 348/14 |
| 5,410,343 | 4/1995 | Coddington et al. | 348/7 |
| 5,534,912 | 7/1996 | Kostreski | 348/6 |
| 5,572,347 | 11/1996 | Burton et al. | 359/124 |
| 5,608,447 | 3/1997 | Farry et al. | 348/7 |
| 5,684,789 | 11/1997 | Habeck et al. | 370/244 |

*Primary Examiner*—Ajit Patel
*Assistant Examiner*—Chi ho Andrew Lee
*Attorney, Agent, or Firm*—John W. Hayes; Dennis J. Williamson

[57] ABSTRACT

The outside distribution plant of the invention consists of a remote narrowband terminal such as a digital loop carrier and a remote broadband terminal such as broadband distribution element or the like that receive narrowband and broadband telecommunications signals, respectively, from a switching system or other network element. The signals are delivered to a variety of different types of line cards where each of the different types of line cards provide a different type of telecommunications service as is known in the prior art. Connection lines emanating from selected ones of the broadband line cards are connected to the inputs of a remotely controlled crossbar array where the inputs of the array can be selectively connected to the outputs of the crossbar array. The outputs of the crossbar array are connected to distribution lines that terminate at one of a plurality of diplex filters. By properly configuring the crossbar array, the broadband line cards can be connected to any of the diplex filters such that any customer line has access to any available broadband line card. A plurality of narrowband line cards are connected to the diplex filters such that a combined broadband and narrowband signal can be delivered to selected ones of the customer lines. In this manner the network resources can be efficiently distributed among the customer lines. Likewise, connection lines emanating from other narrowband line cards are connected to the inputs of a second remotely controlled crossbar array to allow a second narrowband line to be connected to selected ones of the customers.

9 Claims, 8 Drawing Sheets

METHOD AND APPARATUS FOR CROSSCONNECTING TRANSMISSION MEMBERS IN THE OUTSIDE DISTRIBUTION PLANT OF A TELECOMMUNICATIONS NETWORK TO PROVIDE A COMBINED NARROWBAND AND BROADBAND SIGNAL

CROSS-REFERENCE TO RELATED APPLICATION

This application is related to the applications of:

Charles C. Byers entitled "Method And Apparatus For Crossconnecting Transmission Members In The Outside Distribution Plant Of A Telecommunications Network"; and Charles C. Byers entitled "Method And Apparatus For Crossconnecting Transmission Members In The Outside Distribution Plant Of A Telecommunications Network For Providing Access To Customer Lines To A Plurality of Service Providers" which applications are assigned to the assignee of the present application, and are being filed concurrently herewith.

BACKGROUND OF THE INVENTION

The invention relates, generally, to the outside distribution plants of telecommunications networks and, more particularly, to a method and apparatus for crossconnecting transmission members in the outside distribution plant to create greater flexibility and efficiency in the providing of combined narrowband and broadband signals to the customer.

It will be appreciated that the typical telecommunications network consists of a plurality of switching systems connected to one another to allow the transmission of signals therebetween. Certain of the switching systems, usually referred to as central office switches, are connected to customer premise equipment (customer line) such as telephones, fax machines, multimedia equipment, personal computers and the like by an outside distribution plant such that the customer lines can communicate with one another via the network.

The outside distribution plant typically consists of optical links connecting the switching systems to remote terminals such as digital loop carriers. One such digital loop carrier is the SLC® digital loop carrier manufactured and sold by Lucent Technologies Inc. Digital loop carriers function to provide less expensive loops than copper loops by converting switch interfaces to fiber and back to copper at the remote terminal and consist of an optical remote terminal that interfaces with the optical links from the switching systems. The optical remote terminal connects the optical links to a plurality of line cards where each line card hosts transmission members such as twisted pair distribution lines. It is further known in the art to provide broadband remote terminals for delivering broadband signals and narrowband remote terminals for delivering narrowband signals.

It will be appreciated that different types of line cards support these different types of service. For example, the most common line card supports narrowband service such as POTS service. Other narrowband line cards support coin service, ISDN service, and special service such as data port, DC alarm, radio broadcast and other special services. Broadband line cards support broadband service such as asynchronous transfer mode (ATM) carried on one of a family of digital subscriber lines (DSL), switched digital video (SDV) or the like. Each line card includes one or more line circuits to which the distribution lines are connected and that control the processing of signals over those lines. Common circuitry is also provided on each line card to control functions common to all of the lines hosted by that line card. It will be understood that common control elements are provided to drive all of the line cards in a remote terminal.

In one distribution plant configuration, combined broadband and narrowband signals are delivered over a single customer line by combining a broadband signal from a broadband line card with a narrowband signal from a narrowband line card using a diplex filter. While the combined narrowband and broadband signal is advantageous, the lines connecting the broadband line cards and the narrowband line cards are hardwired such that the network operator must predict when configuring the network, the demand for the combined signal including the number and identity of customer lines that are to receive the combined signal. Because it is difficult to predict customer demand for such a service, it is virtually inevitable that certain network resources either will remain unused, if fewer customers than predicted request the service, or that insufficient resources will be allocated and some customers will be unable to obtain the service, if a greater number of customers than predicted request the service. Such a situation obviously results in the inefficient use of network resources.

Thus, an improved method and apparatus for more efficiently distributing broadband and narrowband line card functionality over the outside distribution plant is desired.

SUMMARY OF THE INVENTION

The outside distribution plant of the invention consists of a remote narrowband terminal such as a digital loop carrier and a remote broadband terminal such as broadband distribution element or the like that receive narrowband and broadband telecommunications signals, respectively, from a switching system or other network element. The signals are delivered to a variety of different types of line cards where each of the different types of line cards provide a different type of telecommunications service as is known in the prior art. Connection lines emanating from selected ones of the broadband line cards are connected to the inputs of a remotely controlled crossbar array where the inputs of the array can be selectively connected to the outputs of the crossbar array. The outputs of the crossbar array are connected to distribution lines that terminate at one of a plurality of diplex filters. By properly configuring the crossbar array, the broadband line cards can be connected to any of the diplex filters such that any customer line has access to any available broadband line card. A plurality of narrowband line cards are connected to the diplex filters such that a combined broadband and narrowband signal can be delivered to selected ones of the customer lines. In this manner the network resources can be efficiently distributed among the customer lines. Likewise, connection lines emanating from other narrowband line cards are connected to the inputs of a second remotely controlled crossbar array to allow a second narrowband line to be connected to selected ones of the customers.

DETAILED DESCRIPTION

Figure 1:
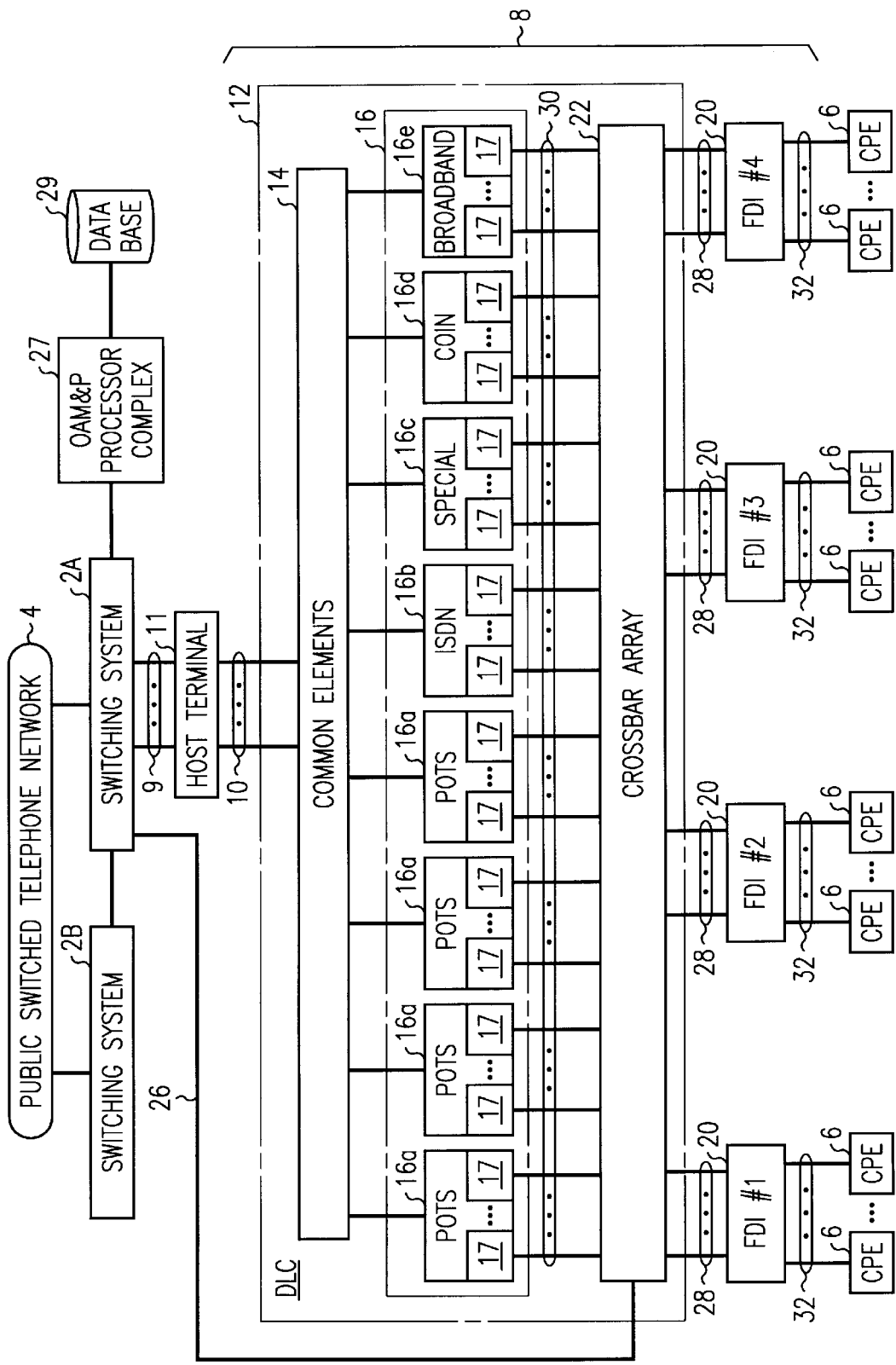
FIG. 1 is a block diagram of a telecommunications network including the apparatus of the invention.

Referring more particularly to FIG. 1, a typical telecommunications network is illustrated consisting of a plurality of switching systems 2A and 2B connected to one another and to other switches in the public switched network (PSTN) 4 as is known in the art to allow communication therebetween. The switching systems can consist of the 5ESS® switching system manufactured and sold by Lucent Technologies Inc. or any other similar switching system. Switching system 2A is a central office switch that is connected to customer premise equipment (customer line) 6, such as telephones, multimedia equipment, fax machines, personal computers or the like, via outside distribution plant 8. Outside distribution plant 8 consists of feeder links 9 connecting switching system 2A to a host terminal 11. The host terminal 11 is connected via optical links 10 to a remote terminal 12. It will be appreciated that while only one digital loop carrier 12 is illustrated, each central office switching system typically hosts a plurality of digital loop carriers. The digital loop carrier 12 is connected to feeder distribution interfaces 20 by distribution lines 28 and the FDIs are connected to the customer line 6 over customer lines or drops 32.

The digital loop carrier 12 includes common elements 14 that interface between optical links 10 from host terminal 11 and line cards 16 and that provide common control functionality for all of the line cards. Each line card is specifically designed to provide a particular type of service to the customer premise. For example, line cards 16a are narrowband line cards that provide POTS (plain old telephone service) service; line cards 16b are ISDN (integrated services digital network) line cards that provide ISDN service; line cards 16c are special line cards that provide special services such as data port, DC alarm or the like; line cards 16d are coin line cards that provide coin service and line cards 16e are broadband line cards that provide broadband service such as digital subscriber line (DSL) or switched digital video (SDV). Each line card includes a plurality of line circuits 17 for providing the particular type of service supported by that line card, these line circuits being provided on a one to one basis for each distribution line hosted by the line card. In addition, each line card includes common circuitry that provides functionality common to all of the line circuits. It will be appreciated that greater manufacturing and economic efficiencies are gained by increasing the number of line circuits (and the corresponding number of lines hosted) per line card. Currently, a typical coin line card 16d includes two line circuits while a POTS line card 16a includes four to eight line circuits. The trend in the industry is to increase the number of line circuits per line card and it is expected that up to 32 line circuits per line card will be employed in the near future. One typical digital loop carrier serves approximately 800 twisted pair distribution lines 28. Thus, between 40 and 150 line cards 16 are provided in the digital loop carrier 12 depending upon the types of service provided by the line cards and the number of lines supported per line card.

Unlike the prior art systems, in the embodiment of the invention shown in FIG. 1 the line cards 16 are not directly wired to the feeder distribution interfaces (FDI) 20. Instead, the line circuits of all of the line cards are wired to the inputs of crossbar array 22 via twisted pair connections 30. The outputs of the crossbar array 22 are connected to the FDIs 20 via distribution lines 28 such that a connection 30 from any of the line cards 16 can be connected to any one of the FDIs 20. The outputs of the crossbar array 22 are relatively evenly dispersed between the four FDIs 20 such that each FDI is connected to approximately one fourth of the distribution lines 28.

In a preferred embodiment, the crossbar array 22 consists of mechanical four pole single throws (4PST) relays for selectively connecting the array inputs to the array outputs as desired by the service demands on the system. It will be appreciated that other devices for connecting the inputs to the outputs such as latching relays, solid state relays, electronic switches or different contact arrangements can be used if desired. The opening and closing of the relays is controlled by the operations, administration, maintenance and provisioning (OAM&P) processor complex 27 via control link 26. It will be appreciated that the OAM&P processor complex 27 communicates with the control link 26 through the network where in the illustrated embodiment processor complex 27 and link 26 communicate through switching system 2A; however, the processor complex 27 could be connected to another switching system in the network as is known in the art. When a customer requests new or additional service such as adding a second line or requesting ISDN service, the OAM&P processor complex 27 determines the FDI hosting that customer's customer line and an available line circuit on the appropriate line card. The status of the line card and FDI connections are maintained in a data base accessible to the OAM&P processor complex such as in central office switching system 2A or in a database 29 directly accessible by OAM&P processor complex 27. Once the appropriate line card and FDI are identified, the OAM&P processor complex 27 controls the crossbar array 22 to crossconnect the connection 30 from the identified line circuit on the appropriate line card to the identified FDI. As a result, a connection can be selectively made from any line card to any FDI under the remote control of OAM&P processor complex 27 thereby efficiently utilizing the line card resources and eliminating the need for craft personnel to physically connect the line card to the FDI in response to a service request by a customer. The distribution lines 28 are connected to the customer drops 32 at the FDIs 20 in the known manner.

Figure 4:
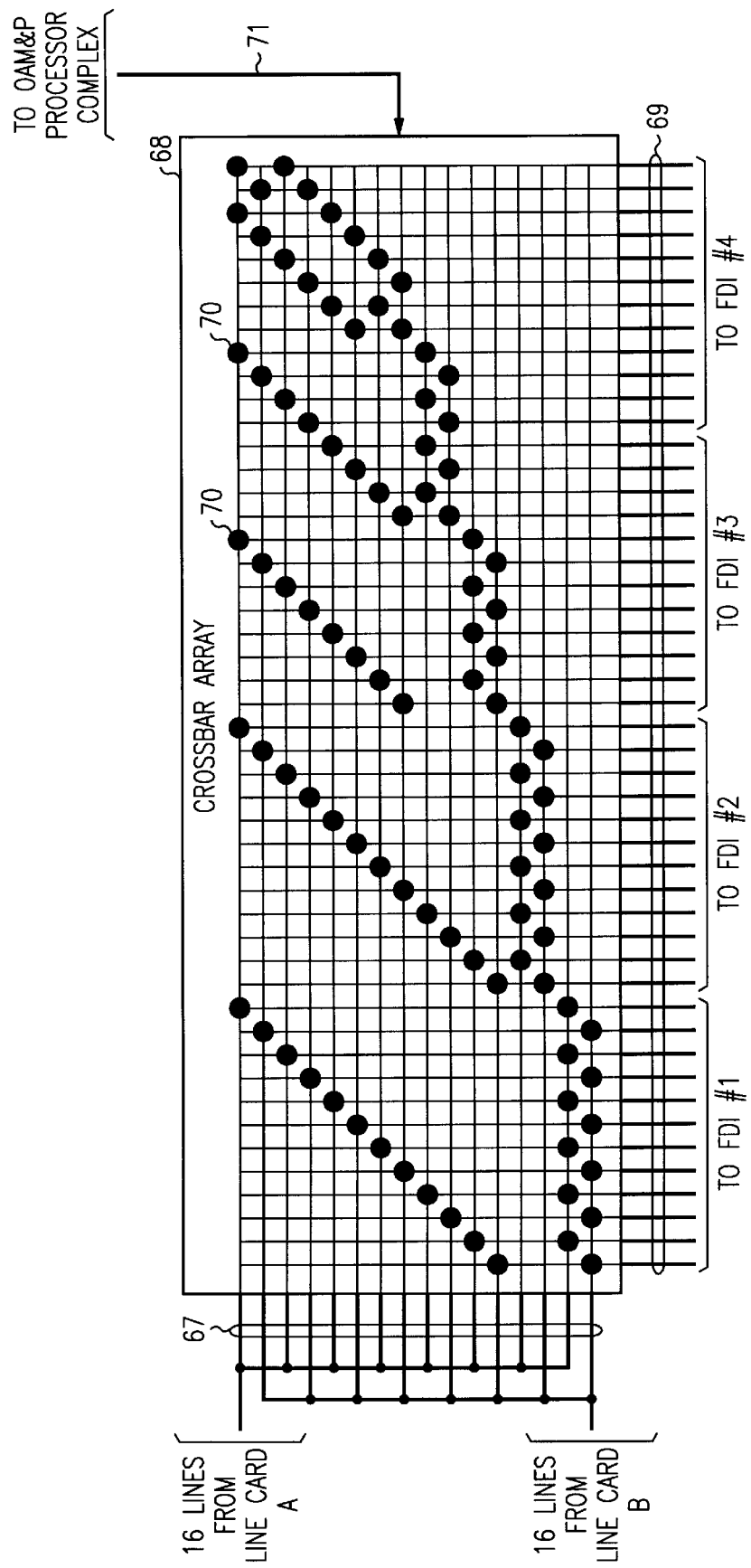
FIG. 4 shows the configuration of a crossbar array of the invention.

In the embodiment described with respect to FIG. 1, any connection line 30 emanating from any line card can be connected to any FDI via the fully deployed crossbar array 22. The array is considered fully deployed in that any input can be connected to any output. While such an arrangement provides maximum flexibility and efficiency in the use of the line card line circuits, the crossbar array 22 is a complicated device because it is capable of connecting any one of the connections 30 to any one of the distribution lines 28. To simplify the construction of the crossbar array it is possible to eliminate some of the complexity using using a less than fully deployed crossbar array. Because it is only necessary for any connection 30 to be connected to any FDI 20 (rather than to every distribution line 28) it is not necessary to connect every crossbar array input to every crossbar array output. In order to achieve the desired connection between each connection line 30 and each of the four FDIs, it has been determined that connecting two inputs to two outputs in a pattern similar to that disclosed in FIG. 4 provides sufficient connectivity with acceptable blocking. It will be appreciated that other patterns can also be used if desired. Because the vast majority of line cards in the typical system are POTS line cards and the vast majority of service used by customers is POTS service, it may not be particularly advantageous in all applications to be able to connect any line card output to any FDI such that the simplified arrangement of FIG. 2 may be used.

Figure 2:
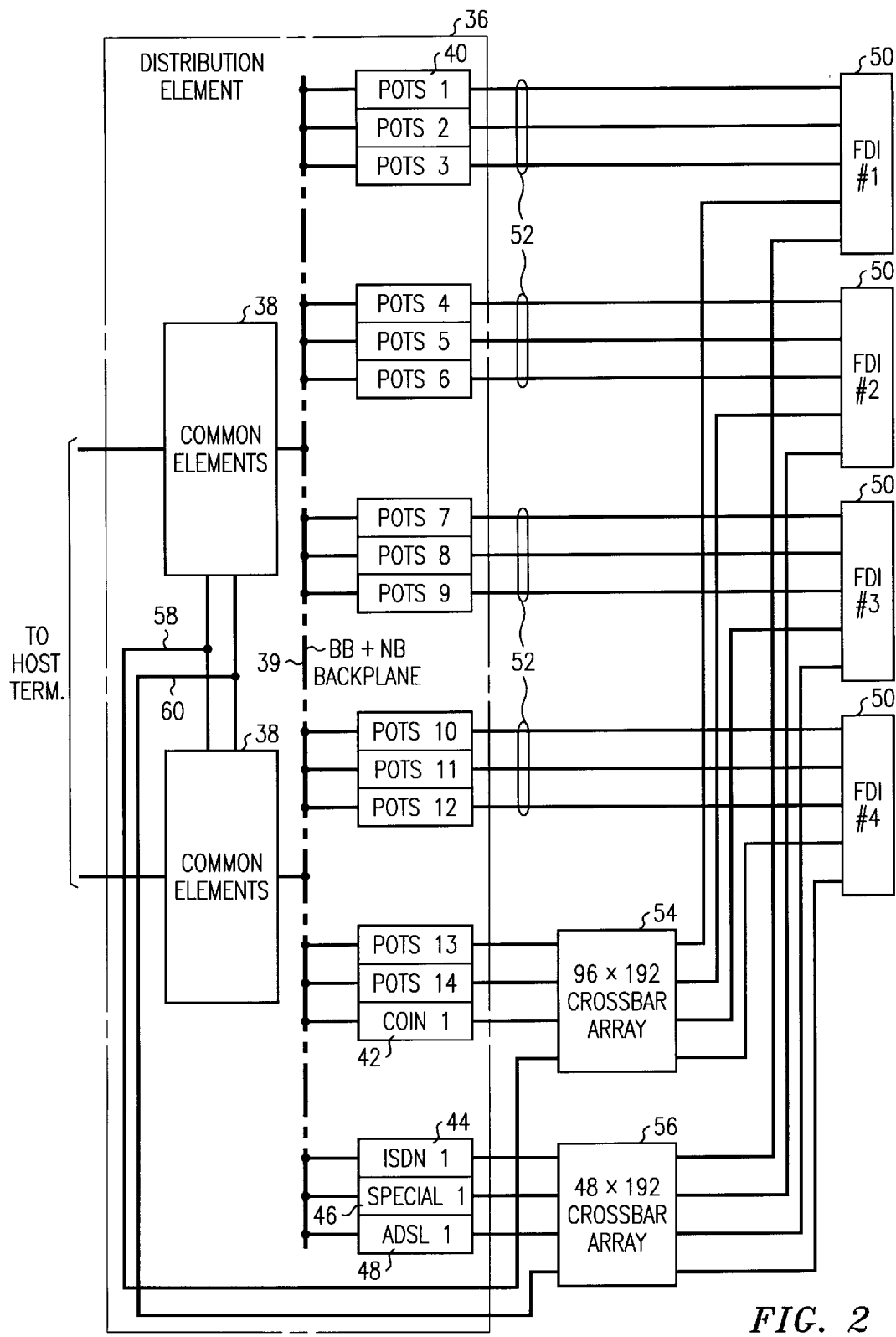
FIG. 2 shows an alternate embodiment of the system of the invention.

Referring to FIG. 2, a relatively simple and inexpensive crossbar array is employed to provide efficient use of line card resources according to the illustrated distribution plant architecture. A remote terminal such as broadband distribution element 36 commonly used in ATM based networks is illustrated, it being understood that the principles of the invention are also applicable to remote terminals such as the digital loop carrier of a narrowband system shown in FIG. 1 or any similar remote terminal. Distribution element 36 consists of common control elements 38 for receiving the ATM cells from a host terminal and for feeding those ATM cells onto the broadband and narrowband backplane 39. The ATM cells, based on their header addresses, are captured by the appropriate line card for distribution to the customer premise as is known in the art.

In the illustrated system, fourteen POTS line cards 40 are illustrated where each POTS line card includes 32 line circuits (not shown) for hosting 32 distribution lines 52. In addition to the POTS line cards 40, a coin line card 42, ISDN line card 44, special line card 46 and one or more of a family of DSLs such as ADSL (asymmetric digital subscriber line) line card 48 are also provided. It is to be understood that ADSL line card 48 provides broadband service to the customer premise and is manufactured and sold by Paradyne Inc. The coin line card 42 has 32 line circuits and each of the other line cards has 32 line circuits. It will be appreciated that the specific mixture of line cards and number of line circuits depends upon the mixture of services required by the customers served by the network and that the mixture of line card types is not limited by the specific example illustrated in FIG. 2.

Each of the first twelve POTS line cards are hard wired directly to the FDIs 50 via distribution lines 52 where the distribution lines from three of the line cards are connected directly to each of the four FDIs. These POTS line cards provide basic POTS service for the primary line telephone service to the customers. Although presently most customers require basic POTS service, it will be understood that if other types of service predominate, the line cards connected directly to the FDIs could provide other than POTS service.

Each of the 32 lines from the thirteenth and fourteenth POTS line cards and the 32 lines from the coin line card 42 are connected to the inputs of a 96×192 crossbar array 54. The 192 outputs of crossbar array 54 are connected to the FDIs 50 where each FDI receives 48 of the 192 outputs. The crossbar array 54 allows the lines emanating from these three line cards to be connected to any one of the four FDIs. Likewise, the 48 outputs of the ISDN line card 44, special line card 46 and ADSL line card 48 are connected to the 48 inputs of the 48×192 crossbar array 56. The 192 outputs of the crossbar array 56 are connected to the FDIs 50 where each FDI hosts 48 of the outputs. The crossbar array 56 allows the lines emanating from the line circuits on these line cards to be connected to any one of the four FDIs. In this manner selected lines on any of the FDIs can provide coin, ISDN, DSL or special services or a second POTS line by properly configuring the crossbar arrays 54 and 56. The crossbar arrays are controlled by the networks operations, administration, maintenance and provisioning (OAM&P) processor complex (not shown) via logical control links 58 and 60, respectively, as previously described.

Figure 3:
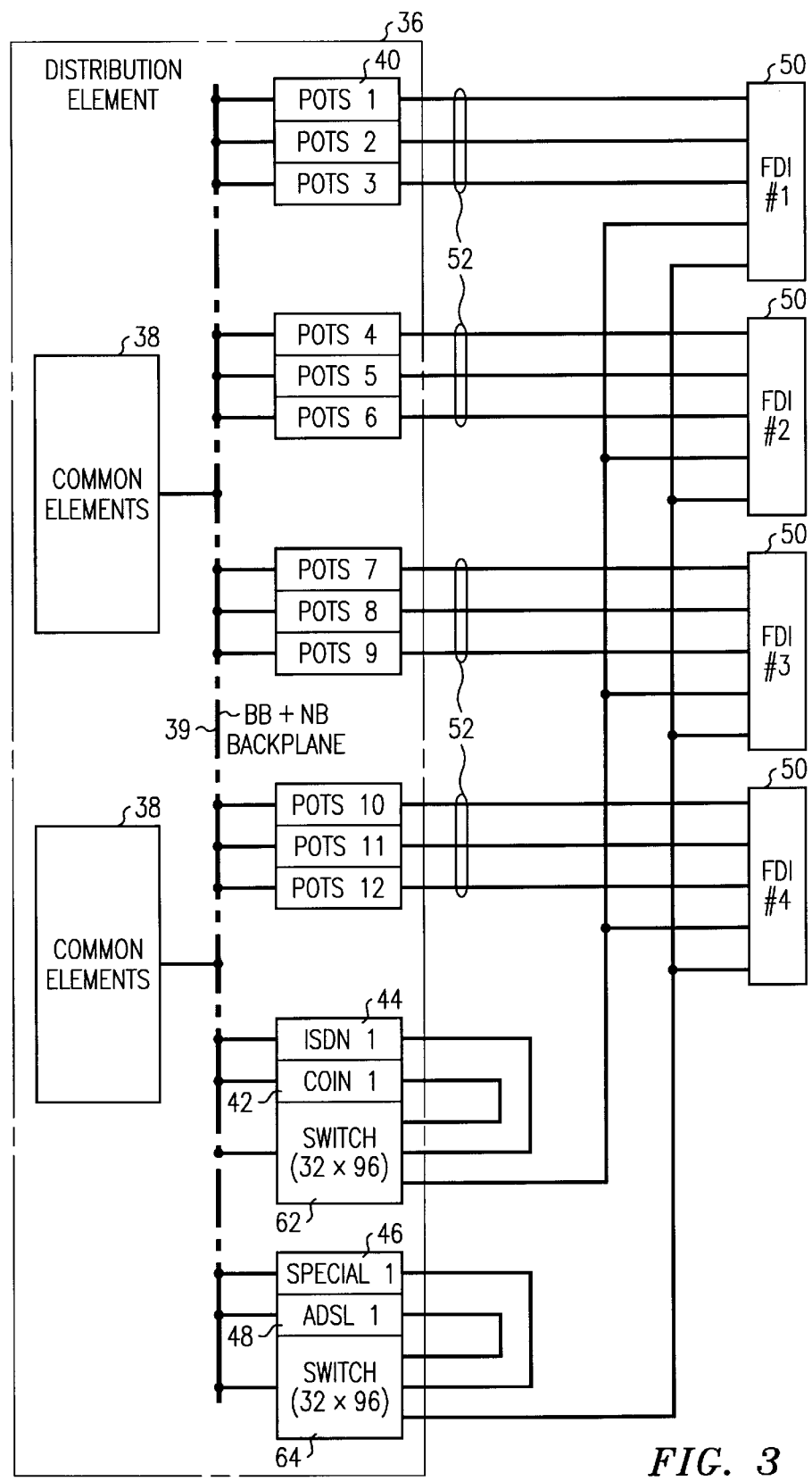
FIG. 3 shows an alternate embodiment to the system of FIG. 2.

Referring more particularly to FIG. 3, an alternate arrangement of the architecture of FIG. 2 is illustrated. The architecture illustrated in FIG. 3 is the same as that of FIG. 2 (where like reference members represent like components in the Figures) except that the crossbar arrays 54 and 56 are eliminated and smaller crossbar arrays 62 and 64 are integrated into the backplane 39 of the distribution element 36 rather than being standalone devices. The crossbar arrays 62 and 64 can be designed to be interchangeable with the line cards. The control messages for controlling the crossbar arrays can be delivered over the broadband and narrowband backplane 39 thereby eliminating the need for separate control links to the OAM&P processor complex. This arrangement also avoids the need for a separate network element to house the crossbar arrays but size limitations of the distribution element 36 may limit the size of the crossbar arrays and the corresponding versatility of the system.

Referring to FIG. 4, an example of the crossbar array of the invention is illustrated. The illustrated crossbar array 68 is a 32×96 array where 32 inputs 67 can be crossconnected to selected ones of 96 outputs 69 where the outputs 69 are separated into four groups, each group being destined for a different FDI. While the illustrated crossbar array is a 32×96 array, it will be appreciated that the specific size of the array is dictated by the number of lines to be received from the line cards and the number of distribution lines to be dispersed between the FDIs, and the blocking probability desired, including but not limited to the sizes described with reference to the embodiments of FIGS. 1 through 3. It is not necessary to provide a fully deployed crossbar array in which any of the inputs can be connected to any of the outputs because the outputs connected to any one FDI can be connected to any customer line hosted by that FDI. Thus, provided that any of the inputs of the crossbar array can be connected to any one of the FDIs hosted by the remote terminal, the system is sufficiently flexible to accommodate any customer request. As a result, it is not necessary to populate every input to output intersection of the crossbar array with a latching relay. The illustrated crossbar array consists of 16 lines from line card A and 16 lines from line card B connected to the 32 inputs 67 of the crossbar array. It will be noted that each line of FIG. 4 represents two pairs of wires such that the eight lines of the drawing emanating from each of the line cards represents 16 physical distribution lines each line consisting of a twisted pair of wires. The vertical lines of the crossbar array, representing the array outputs 69, are arranged in four groups of twelve, each group being connected to one of four FDIs.

Four pole single throw latching relays 70 are arranged such that selected ones of the inputs can be connected to selected ones of the outputs to allow any line card to be connected to any one of the four FDIs. Because it is not necessary to connect all of the inputs 67 to all of the outputs 69, it is not necessary to provide a latching relay at every input/output intersection. Thus, the cost and size of the crossbar array is greatly reduced. Because the lines are arranged as two pairs (i.e. each line of the drawing represents two physical twisted pair lines) and the relays are four pole relays each two pair is connected and disconnected simultaneously. Alternatively, the pairs of wires could be connected independently using double pole relays. A control link 71 from the OAM&P processor complex of the network controls the state of the relays to selectively connect the array inputs to the array outputs. While a specific pattern of the relays in the crossbar array is illustrated it will be appreciated that other configurations of the relays can be used provided the inputs can be connected to the FDIs with acceptable blocking rates.

Figure 5:
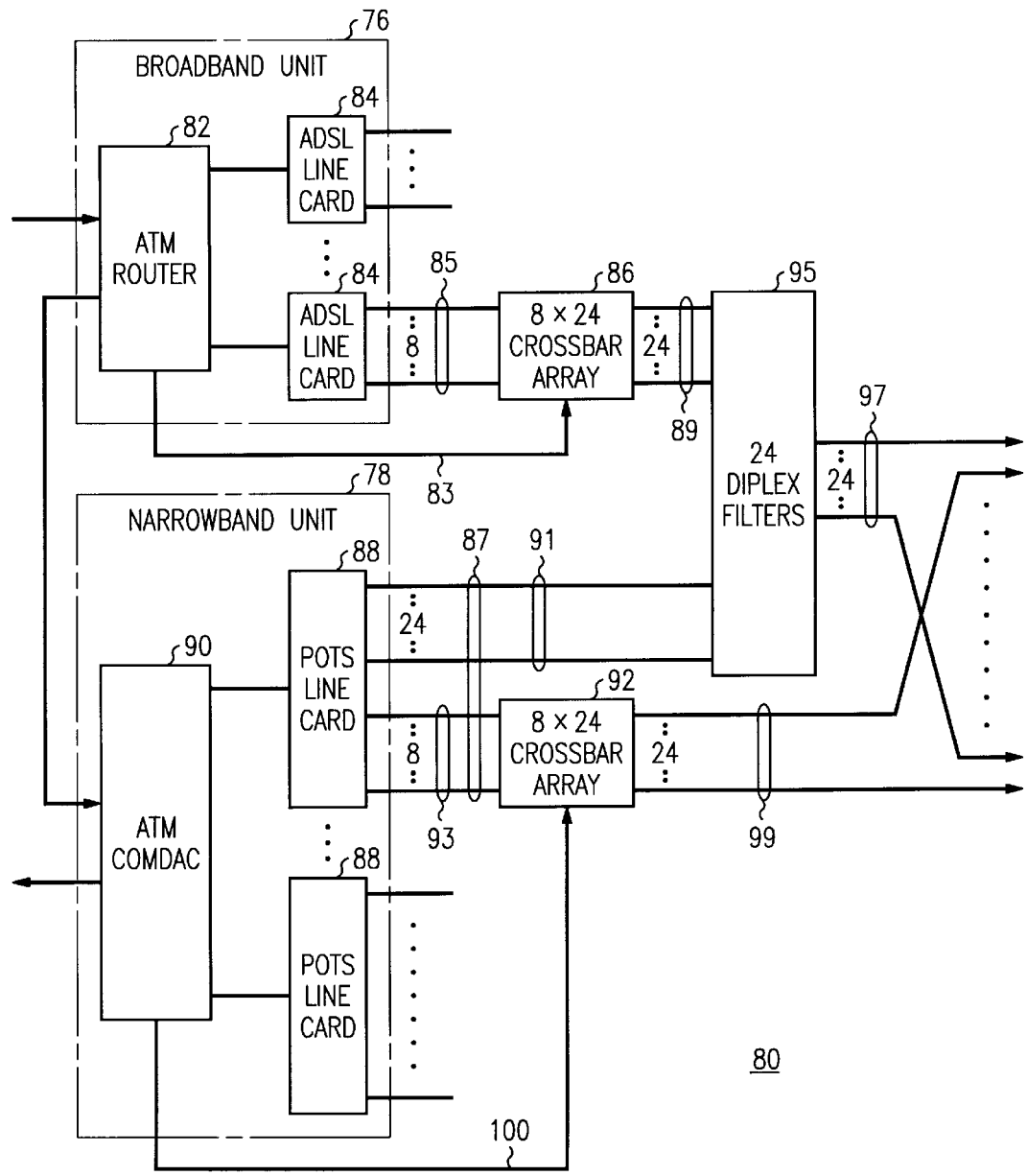
FIG. 5 shows an arrangement of a broadband system utilizing the system of the invention.

Referring to FIG. 5, a further network architecture using the principles of the invention is illustrated for delivering broadband and narrowband traffic over the same customer drop using an ADSL line card manufactured and sold by Lucent Technologies Inc. or any similar line card. A broadband distribution element 76 and a separate narrowband distribution 78 element receive ATM cells from an ATM switching element or host terminal. As illustrated, the broadband unit and narrowband unit form part of a ring distribution configuration 80 where the ATM cells are delivered to an ATM router 82 in the broadband unit 76. Alternatively, the distribution to the remote terminals could be accomplished using point to point, tapers or passive optical networks. Based on the ATM cell header address, the cells carrying broadband traffic are routed to the appropriate ADSL line card 84 for distribution to the FDIs and the cells carrying narrowband traffic are routed to the ATM common elements 86 of the narrowband unit where the cells are routed to the appropriate POTS line card 88. It is to be understood that the specific architecture of the broadband and narrowband units can vary.

It is assumed that the ADSL line cards 84 host eight lines 85 and the POTS line cards 88 host 32 lines 87 although the specific number of lines hosted per card can vary. The eight lines from one of the ADSL line cards 84 are delivered to the eight inputs of an 8×24 crossbar array 86. The 24 outputs of the crossbar array 86 are connected one each to the inputs of 24 diplex filters 95 via lines 89 as instructed by the OAM&P processor complex (not shown) via the ATM network and control link 83. A first subset 91, i.e. twenty-four, of 32 lines from one of the POTS line cards 88 are also delivered one each to the 24 diplex filters 95. The diplex filters 95 combine the broadband and narrowband traffic for subsequent delivery to the customer premise. The output of the 24 diplex filters 95 provide 24 primary line drops 97. Of these 24 primary line drops, all 24 provide POTS service and any 8 of the 24 provide broadband service depending upon the configuration of the crossbar array 86. In this regard, in the preferred embodiment the number of lines emanating from the crossbar array 86 should equal the number of POTS lines in the first 91 subset.

Figure 6:
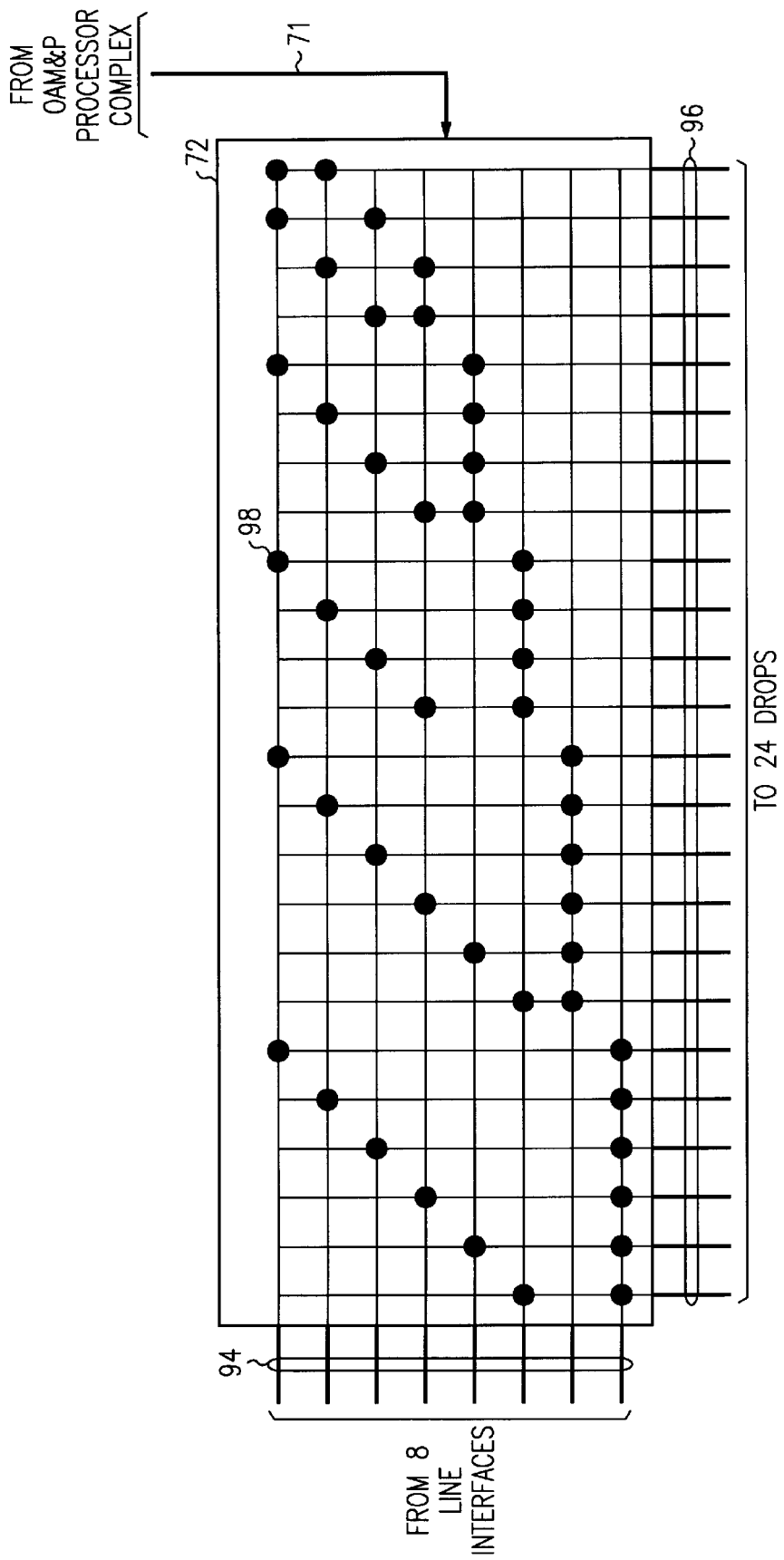
FIG. 6 shows an alternate embodiment of the crossbar array of the invention.

A second subset 93, i.e. remaining eight lines from the POTS line cards 88, are delivered to a second 8×24 crossbar array 92. These eight lines can be connected to one of the twenty-four customer premises to provide a second POTS line drop 99 to selected ones of the customer premises. The arrangement of the 8×24 crossbar array 92 is illustrated in FIG. 6 where the eight inputs 94 can be connected to the twenty-four outputs 96 via double pole single through relays 98. Again it is not necessary to completely populate the crossbar array with relays. In the illustrated embodiment, 48 relays, two per drop, are used to provide sufficient connectability with acceptable blocking. The configuration of the crossbar array 92 is controlled by the OAM&P processor complex via control link 100. Crossbar array 86 has a similar construction. Note that in the illustrated arrangement, the outputs of the crossbar array 92 and of the diplex filters 95 are connected directly to the customer lines rather than to the feeder distribution interfaces as was done in the previously described embodiments.

Figure 7:
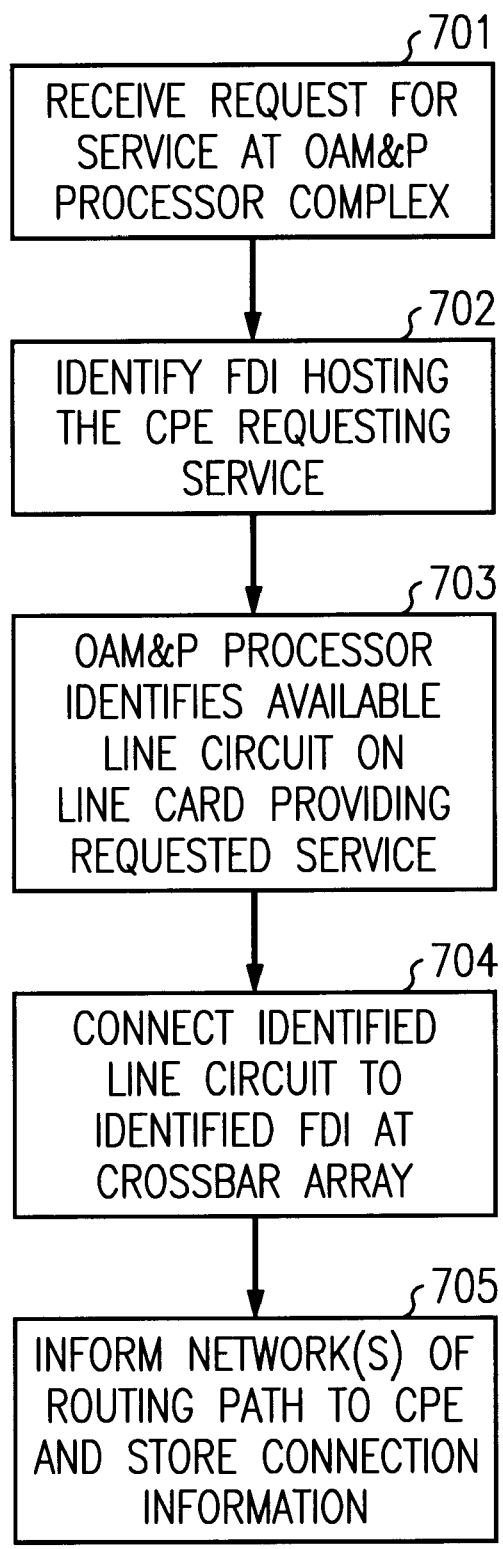
FIG. 7 is a flow diagram illustrating the method of operation of the system of the invention.

The operation of the system of the invention will now be described with reference to FIG. 7. A request for customer service is received by the network operator for new or additional service from a customer for a particular customer line (block 701). The network operator, through the OAM&P processor complex, identifies the FDI hosting that customer line (block 702). The OAM&P processor complex also identifies a line card that provides the type of service requested by the customer having an unused line circuit (block 703). Once the line card, line circuit and FDI are identified, the OAM&P processor complex controls the relays of the crossbar array to connect the identified line card line circuit with the identified FDI (block 704). Thus, a connection path is established from the appropriate line card line circuit to the FDI hosting the customer line requesting the service. If blocking is encountered (i.e. no relay exists to effect the connection) it may be possible to rearrange the activated relays to create a nonblocking pattern. The OAM&P processor complex informs the network, as is known in the art, of the routing path to access the customer line via the selected line card line circuit and designates the line circuit and crossbar array input and output status in the associated data base as being in use for that connection (block 705). Finally, it may be necessary for craft personnel to manually connect the distribution line to the customer line at the FDI if that connection did not previously exist, as is known in the prior art. If the connection between the FDI and customer line is in place, the operation of the system of the invention can be fully automated.

Figure 8:
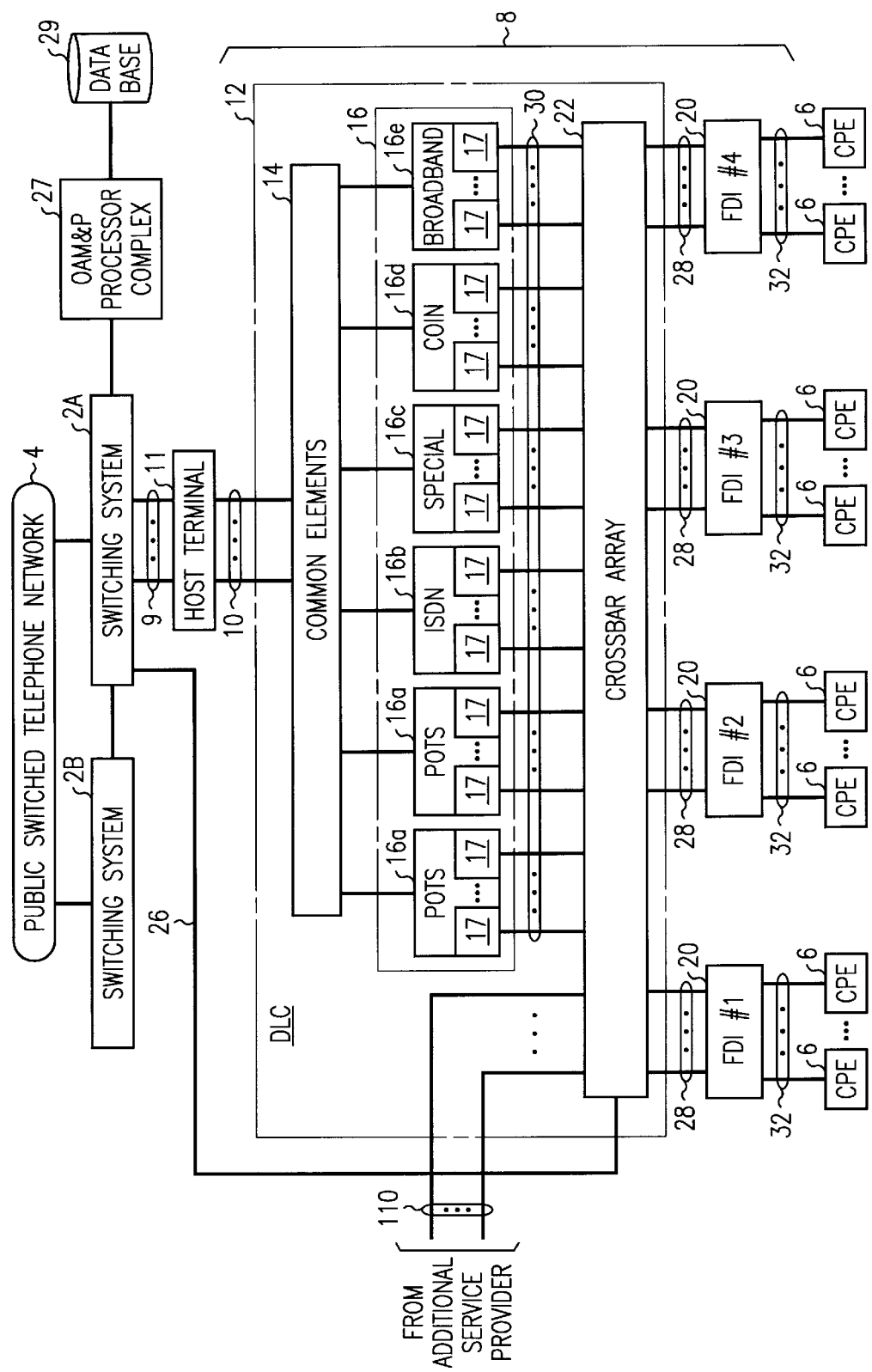
FIG. 8 shows an embodiment of the invention used to create an access point for competitive service providers.

It is also possible to use the crossbar arrays of the invention as the access point for multiple service providers as illustrated in FIG. 8. FIG. 8 shows a network architecture similar to FIG. 1 where like numerals are used to identify like components. As illustrated in FIG. 8, a second service provider can connect twisted pair connection lines 110 to selected ones of the inputs of the crossbar array 22 where the connection lines 110 carry telecommunication signals from that service provider's network elements. These lines can be connected to any customer premise via the crossbar array as previously described such that the second service provider has access to any customer drop. The operation of the system operates as previously described except that the service provider accessing the crossbar array via connection lines 110 and the service provider controlling the crossbar array must coordinate their activities. In this regard, in the operation of the invention described with reference to FIG. 7, the request for service (block 701) is initiated by the second service provider rather than by the customer and the second service provider identifies the connection line to be cross-connected to the service provider controlling the crossbar array. Once the connection has been established, the existing service provider, in addition to storing the connection information for its own use (block 705), must also inform the new service provider of the connection information. Communication between the networks can occur over the existing telecommunications network or via a separate control link. In this manner multiple service providers can gain access to any customer line without having to hardwire connections from its network elements to each of the customer lines. Providing access through the crossbar array eliminates the need for duplication of network elements in the outside distribution plant. Also since some customers are expected to frequently switch service providers, the ability to reconfigure these connections will reduce operational cost. It will be appreciated that while the access arrangement has been described with particular reference to the network architecture of FIG. 8, the access arrangement can be provided with any of the illustrated network architectures by accessing selected inputs to the crossbar arrays with connection lines from a second service provider.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. An outside distribution plant for use in a telecommunications network, comprising:

means for delivering narrowband signals to narrowband line cards and broadband signals to broadband line cards;

a first plurality of lines emanating from said broadband line cards and a second plurality of lines emanating from said narrowband line cards;

first means for selectively connecting any one of said first plurality of lines to one of a plurality of distribution lines, said distribution lines being connected to means for combining the narrowband signals and broadband signals for delivery to a plurality of customer lines;

a first subset of said second plurality of lines being connected to said means for combining to deliver narrowband signals thereto;

a second subset of said second plurality of lines being connected to a second means for selectively connecting any one of said second subset of lines to one of said plurality of customer lines;

means for controlling said first and second means for selectively connecting to remotely control the configuration of the first and second means for selectively connecting.

2. The outside distribution plant according to claim 1, wherein said means for combining comprises diplex filters.

3. The outside distribution plant of claim 1, wherein said means for selectively connecting includes connection lines extending from said line cards and distribution lines extending from customer premise equipment, said connection lines and said distribution lines being crossconnected to one another by a means for crossconnecting.

4. The outside distribution plant of claim 3, wherein said means for crossconnecting consists of a crossbar array including a plurality of inputs connected to said connection lines and a plurality of outputs connected to said distribution lines and a means for connecting said inputs to said outputs.

5. The outside distribution plant of claim 4, wherein said means for connecting said inputs to said outputs include a plurality of latching relays.

6. The outside distribution plant according to claim 1, wherein said means for controlling includes a control link communicating with the operations, administration, maintenance and provisioning processor complex of the network.

7. The outside distribution plant of claim 6, further including a data base accessible by the OAM&P processor complex, wherein said data base maintains the status of said line cards and said means for connecting.

8. The outside distribution plant according to claim 1, wherein said plurality of distribution lines is equal in number to the number of lines in said first subset.

9. A method for delivering signals to customer premise equipment in a telecommunications network, comprising the steps of:

delivering narrowband signals to narrowband line cards and broadband signals to broadband line cards;

delivering the broadband signals from said broadband line cards over a first plurality of lines and delivering the narrowband signals from the narrowband line cards over a second plurality of lines;

selectively connecting any one of said first plurality of lines to one of a plurality of distribution lines, said distribution lines being connected to means for combining the narrowband signals and broadband signals;

connecting a first subset of said second plurality of lines to said means for combining to deliver narrowband signals thereto;

delivering a combined narrowband and broadband signal to customer premise equipment;

selectively connecting a second subset of said second plurality of lines to said customer premise equipment.

* * * * *